May 19, 1925. 1,538,808
A. HEDEEN
CAKE AND PASTRY SERVER
Filed Nov. 23, 1922
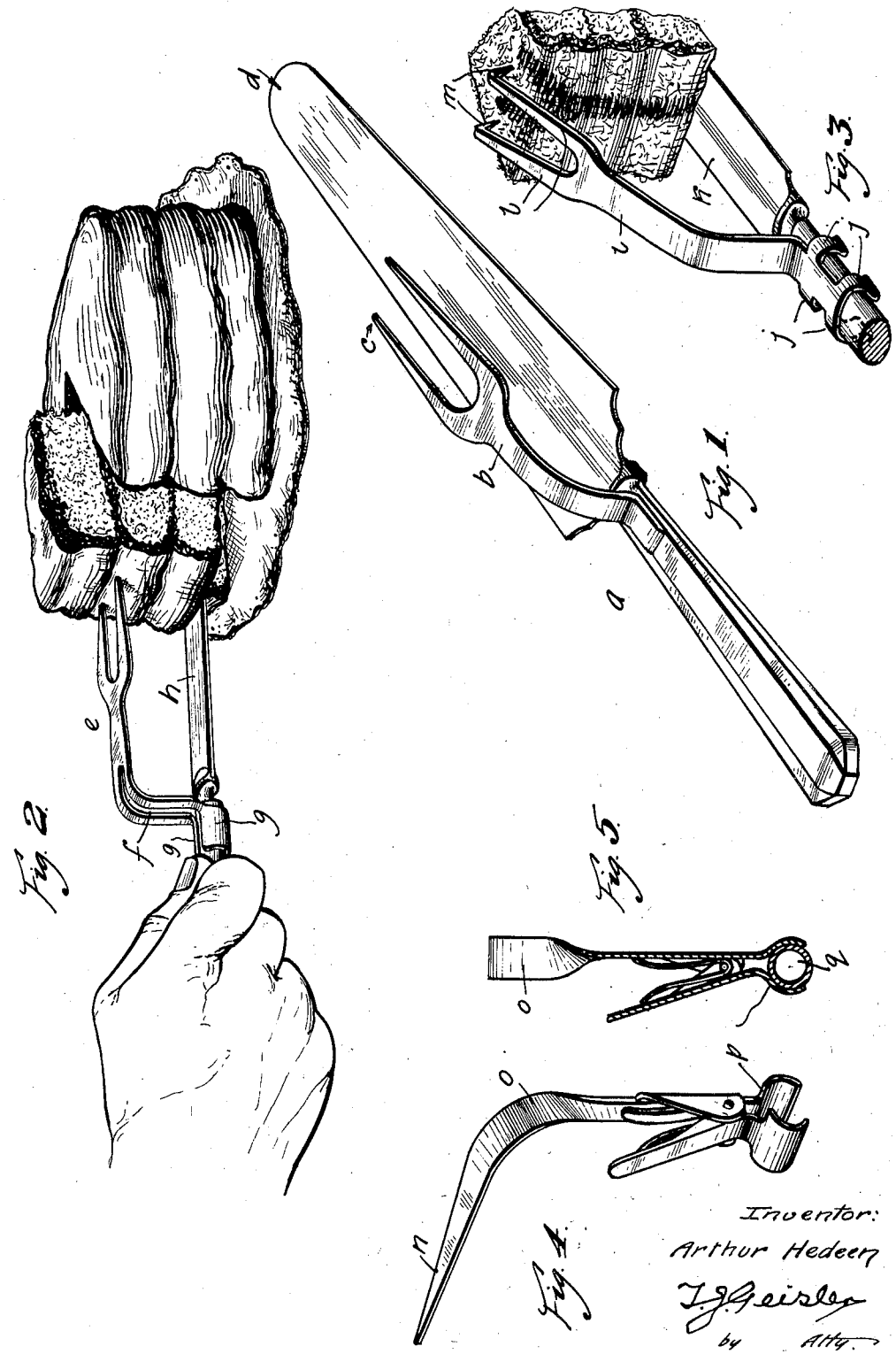
Inventor:
Arthur Hedeen Patented May 19, 1925.

1,538,808

UNITED STATES PATENT OFFICE.

ARTHUR HEDEEN, OF PORTLAND, OREGON.

CAKE AND PASTRY SERVER.

Application filed November 23, 1922. Serial No. 602,796.

*To all whom it may concern:*

Be it known that I, ARTHUR HEDEEN, a citizen of the United States, and a resident of Portland, county of Multnomah, and State of Oregon, have invented a new and useful Improvement in Cake and Pastry Servers, of which the following is a specification.

My invention deals with the serving of cakes, pastries and the like.

The common knife or cake knife are generally used for this purpose, but due to the article served being more or less unstable it tends to slide off the serving implement. Therefore it is usual to use auxiliary means for steadying the article on the server. Frequently a fork or the like is used for so steadying the article; but more frequently the finger of the hand is used for that purpose. The touching of food which another is to eat is frowned upon by those who are guardians of our public health. The handling of food with the fingers inculcates a bad habit. It also is not a neat and appetizing way of serving food, even in the home. But in public places and restaurants is absolutely to be condemned for it is well known to the medical profession that many diseases are transmitted by the fingers and thumbs.

In the hurry of service an auxiliary implement to help steady the piece of cake or pastry carried on the server is not always conveniently handy; the finger is unconsciously brought into service; a particle of the food will most probably adhere to the finger and this will most likely be wiped off on the apron, perhaps first moistening the finger with the mouth.

The object of my invention is, therefore, to provide the server with means adapted to be brought into engagement with, and thus to steady the article being supported and carried on the server, so that the employment of any auxiliary implement or of a finger is avoided.

My invention may be made a permanent part of the server or made in the form of an attachment to be affixed thereon.

The mode in which I have carried my invention into practice is fully illustrated in the accompanying drawings and hereinafter described.

In the drawings:

Fig. 1 is a perspective view showing the cake knife to the shank of which my invention is applied;

Fig. 2 illustrates my invention used as an attachment for an ordinary table knife;

Fig. 3 illustrates a similar use of my invention as shown by Fig. 2 with this modification: The tips of the prongs of the fingers being arranged for being engaged with the top of the piece of cake instead of being inserted in the rim of the latter as shown in Fig. 2;

Figs. 4 and 5 respectively, illustrate variations that may be made in the means by which my invention is adapted to be affixed on a serving implement and these views also show that the free end of the finger may consist of a single prong instead of being bifurcated as shown in the preceding views.

Describing in the first place my invention as a permanent part of the server as shown in Fig. 1: The reference character $a$ shows a common form of server generally known by the names cake knife or pie knife. On the shank of this server my invention is permanently mounted. As will be noted, my invention consists of a finger $b$, the shank of which is curved so that the finger will be arranged offset to the blade of the server or knife. As here shown the tip $c$ of the finger $b$ is made prong like and is adapted to be inserted into the rim of the piece of cake or pastry. In order that the piece of cake or pastry may be supported and carried on the blade the finger $b$ is set back from the tip $d$ of the knife blade.

Describing next the construction of my invention for use as an attachment to a knife or other server: For such purpose the shank of the finger $e$ may be split at its root as shown at $f$ and the root end provided with clamping portions as $g$ adapted to permit the shank or finger to be sprung on and off the shank of the knife $h$.

Fig. 3, as already mentioned, shows a similar construction, the finger $i$ being provided with clamping portions $j$ which also permit it to be secured on the shank of the knife $k$; but as here shown the prong like extremities $l$ have their tips $m$ bent so as to be projected into the top of the piece of cake or pastry to be supported and carried on the blade of the knife.

In either case the shank is necessarily bent as shown so that the finger affixed to the server by which the piece of cake or pastry will be steadied on the server will be offset from the latter approximately as shown.

In Figs. 4 and 5 the extremity n of the finger o is made in the form of a single prong and the root of the finger is provided with spring actuated clamping devices as p for fastening on the shank q of the server.

It will be noted that when my invention is constructed for use as an attachment to a table knife or other server, the means for affixing the steadying finger on the shank of the server are adapted to permit the finger to be moved longitudinally on the shank of the server so that the tip of the finger may be arranged relatively to the tip of the server, thus permitting the forward end of the blade of the server to be used for supporting the piece of cake or pastry and the tip of the finger applied to hold such piece steady.

The constructions illustrated in the drawings merely illustrate such as I have found convenient in practice. Variations therefrom, however, may be made by the manufacturer of my device as he may deem convenient or expedient.

I claim:

1. The combination with a table implement such as a knife of an auxiliary serving member branching and offset from the plane of the handle of said implement thence extending substantially parallel with said plane, said offset straight portion being so proportioned that its extremity is located inward of the tip of said implement.

2. The combination with a table implement such as a knife of an auxiliary serving member branching and offset from the plane of the handle of said implement thence extending substantially parallel with said plane, said offset straight portion being so proportioned that its extremity is located inward of the tip of said implement and said extremity being forked.

3. A serving attachment for a table implement such as a knife comprising a shank provided at one end with means for demountably affixing to the handle of said implement, the other end of the attachment being offset from the plane of said handle, said offset straight portion being so proportioned that its extremity is located inward of the tip of said implement.

4. A serving attachment for a table implement such as a knife comprising a shank provided at one end with means for demountably affixing to the handle of said implement, the other end of the attachment being offset from the plane of said handle, said offset straight portion being so proportioned that its extremity is located inward of the tip of said implement and said extremity being forked.

ARTHUR HEDEEN.